United States Patent [19]

Ishii et al.

[11] Patent Number: 5,170,309
[45] Date of Patent: Dec. 8, 1992

[54] FOUR-POLE CIRCUIT BREAKER

[75] Inventors: Kazuhiro Ishii; Kouji Hirotsune; Ichiro Arinobu; Kazushi Sato, all of Fukuyama, Japan

[73] Assignee: Mitsubishi Denki Kabushiki Kaisha, Tokyo, Japan

[21] Appl. No.: 669,370

[22] Filed: Mar. 14, 1991

[30] Foreign Application Priority Data

Mar. 16, 1990 [JP] Japan .................................. 2-64139

[51] Int. Cl.⁵ .............................................. H02H 3/08
[52] U.S. Cl. ................................................... 361/93
[58] Field of Search .................... 361/93, 94, 95, 96, 361/97, 57, 115, 102

[56] References Cited

U.S. PATENT DOCUMENTS

| 4,589,052 | 5/1986 | Dougherty | 361/94 |
| 4,685,024 | 8/1987 | Martellock et al. | 361/93 |
| 4,819,124 | 4/1989 | Arinobu | 361/97 |
| 4,827,369 | 5/1989 | Saletta et al. | 361/96 |

FOREIGN PATENT DOCUMENTS 63-228914  9/1988  Japan .

Primary Examiner—A. D. Pellinen
Assistant Examiner—C. Schultz
Attorney, Agent, or Firm—Burns, Doane, Swecker & Mathis

[57] ABSTRACT

In a four-pole circuit breaker having U, V, W and N poles for protection of corresponding phases, only an N phase signal, which is reproduced by a current signal reproducing circuit in response to a current flowing through an N phase line, is amplified by a rated current reducing circuit and supplied to a maximum phase signal selection circuit together with other phase signals.

3 Claims, 6 Drawing Sheets

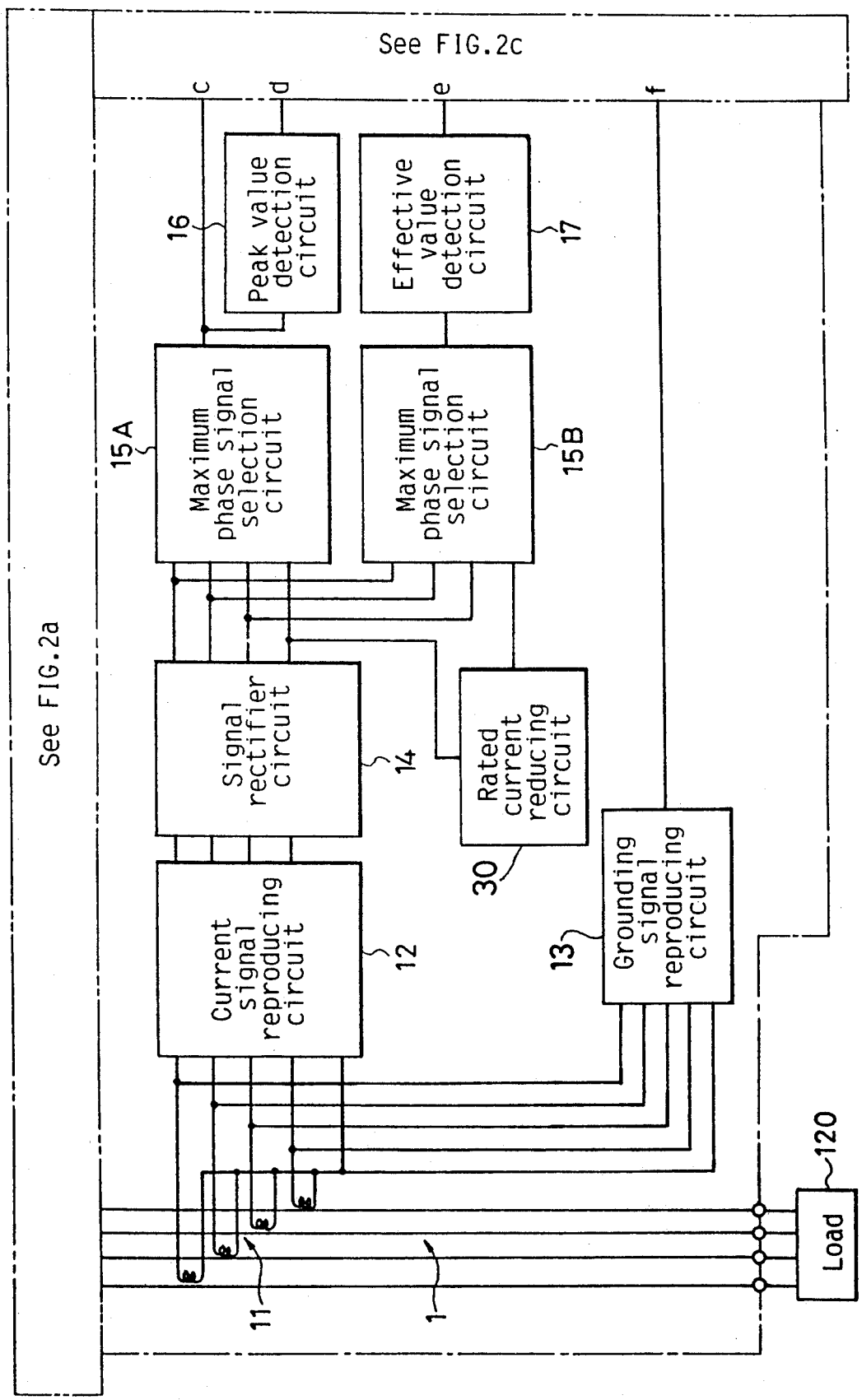

FOUR-POLE CIRCUIT BREAKER

FIELD OF THE INVENTION AND RELATED ART STATEMENT

1. Field of the Invention

The present invention relates to a four-pole circuit breaker having four poles for three-phase fourwire system.

2. Description of the Related Art

In the conventional four-pole circuit breaker generally known, an overcurrent protection function is provided for three phases U, V and W, but not provided for an N phase.

However, some users wish to provide the overcurrent protection function with the N phase as well as other phases. Further, some countries provide an electrical standard that an electric line of the N phase should be of one-half rated current of other phases U, V and W. Therefore, in order to comply with the electrical standard as above-mentioned, it is necessary for the circuit breaker to provide the one-half rated current only with the N pole.

As a result, a basic construction of the four-pole circuit breaker has to be changed in compliance with user's wishes or the electrical standard of the user's country.

OBJECT AND SUMMARY OF THE INVENTION

An object of the present invention is to offer a four-pole circuit breaker which provides an overcurrent protection function with the N phase and is applicable to both N-pole-ratings of the same as and one-half of other phases.

In order to achieve the above-mentioned object, the four-pole circuit breaker of the present invention comprises:

- a current sensor for detecting currents flowing through the respective poles;
- current signal reproducing means for making respective phase signals responding to the currents;
- a rated current reducing circuit which receives and amplifies only N phase signal of the respective phase signals;
- a maximum phase signal selection circuit which receives U, V and W phase signals of the respective phase signals and N phase signal which is amplified by the rated current reducing circuit, the maximum phase signal selection circuit selecting the maximum phase signal of said U, V and W phase signals and the amplified N phase signal; and
- a trip circuit for generating a trip signal in response to the maximum phase signal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2a, 2b and 2c are combination views which constitute the same block diagram as FIG. 1.

DESCRIPTION OF THE PREFERRED EMBODIMENTS

Hereafter, a preferred embodiment of the present invention is described with reference to the accompanying drawings.

Figure 1:
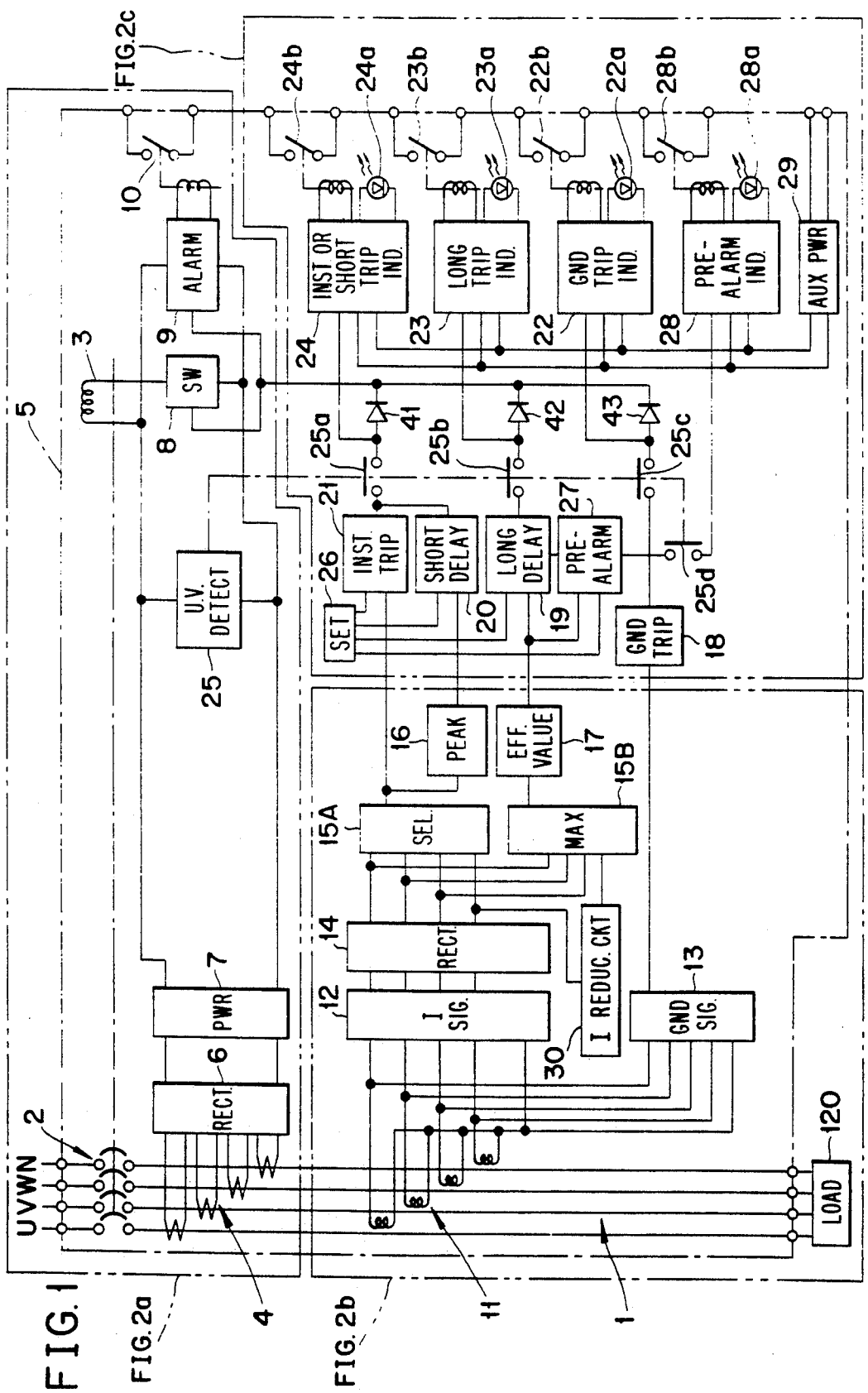
FIG. 1 a block diagram showing a four-pole circuit breaker of the present invention.
Figure 2A:
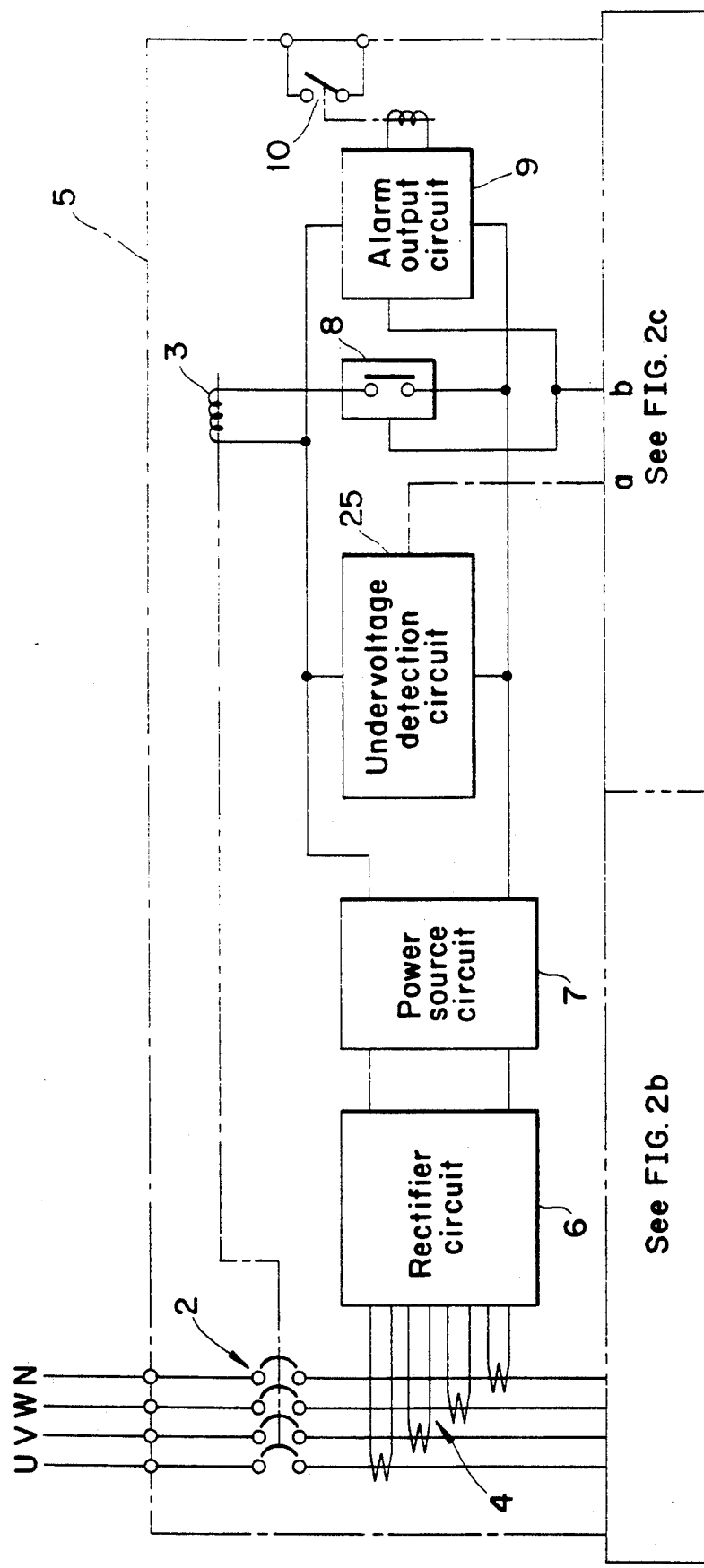
Figure 2C:
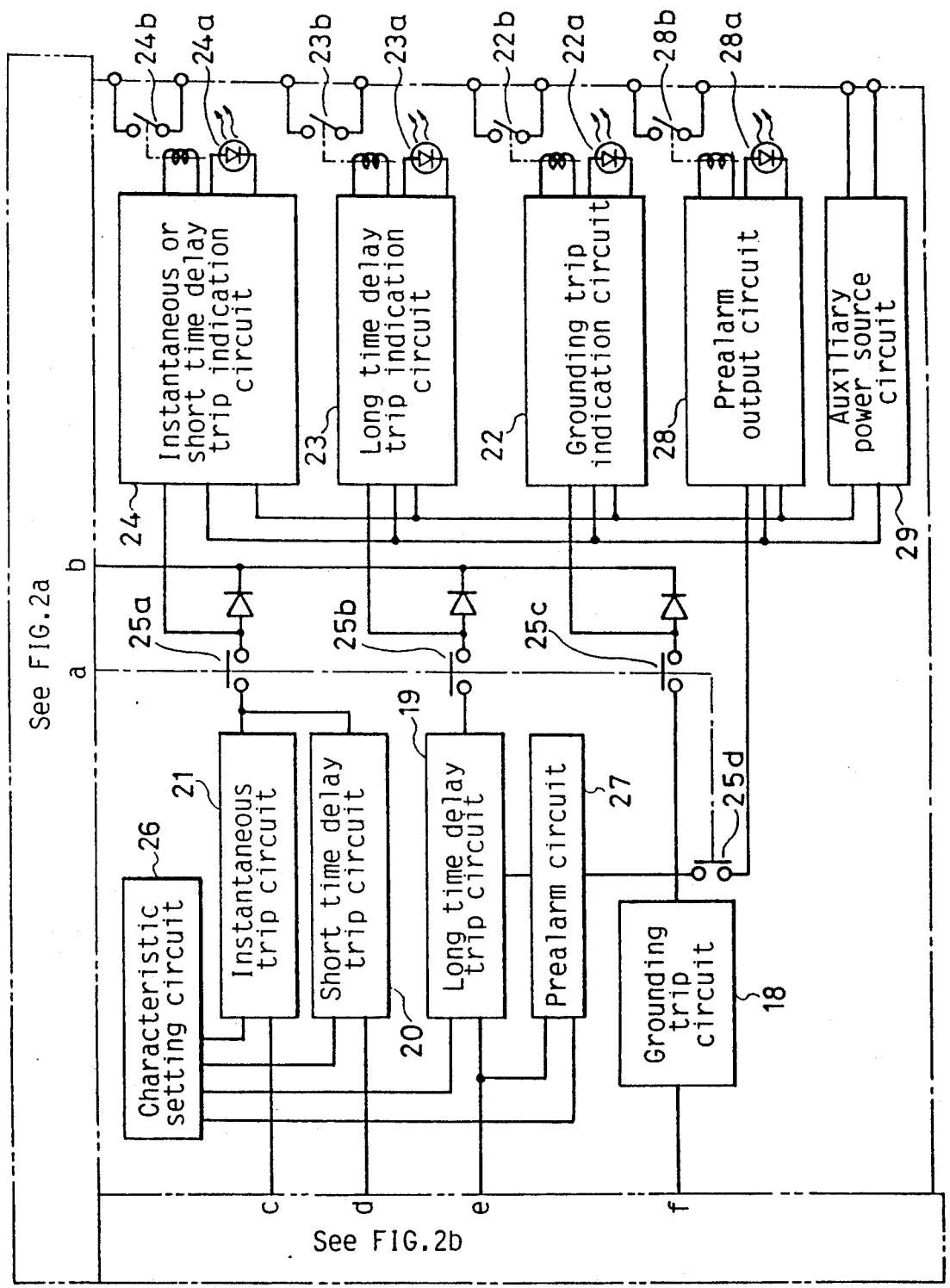

FIG. 1 is a block diagram showing the whole configuration of a four-pole circuit breaker 5. FIGS. 2a, 2b and 2c are combination views each showing detailed configurations of respective parts of the block diagram as FIG. 1. An A.C. power source (not shown) and a load 120 are electrically connected via a main contact 2 and a main circuit conductor 1 for four phases (U,V,W,N). The main contact 2 is opened by a trip coil 3 via a trip mechanism (not shown). Respective phase currents flowing through the main circuit conductor 1 are extracted by four current transformers 4. Output currents of the current transformers 4 are converted into a D.C. voltage by means of a rectifier circuit 6. A power source circuit 7 receives this D.C. voltage and supplies a predetermined voltage to several circuits which will be mentioned later. A solid state switch 8 is connected in series to the trip coil 3 so that the D.C. voltage supplied from the power source circuit 7 is applied to the trip coil 3 through the switch 8. An alarm output circuit 9, which receives the D.C. voltage from the power source circuit 7, issues an alarm signal in response to a trip signal inputted through each of diodes 41, 42 and 43. An alarm output relay 10 is closed/opened in response to operation of the alarm output circuit 9.

Four air-core coils 11 are electromagnetically connected to the main circuit conductor 1. A current signal reproducing circuit 12, which is connected to the air-core coils 11, reproduces current signals (voltage) in response to output signals of the air-core coils 11. A grounding signal reproducing circuit 13 is connected to the air-core coils 11 in parallel with the current signal reproducing circuit 12. This grounding signal reproducing circuit 13 reproduces a grounding signal in response to a real grounding current flowing through the main circuit conductor 1.

The current signals reproduced in the current signal reproducing circuit 12 are rectified by a signal rectifier circuit 14. A maximum phase signal selection circuit 15A selects the maximum instantaneous value of rectified signals of respective phases. A maximum phase signal selection circuit 15B selects one phase signal, which contains the largest signal within a predetermined time interval, from among respective phase signals. A rated current reducing circuit 30 is provided on the N phase line between the signal rectifier circuit 14 and the maximum phase signal selection circuit 15B. The rated current reducing circuit 30 serves to reduce a rated current of the N phase. A peak value detection circuit 16 receives the maximum recitifed signal from the maximum phase signal detection circuit 15A and converts it into a peak value to be detected. An effective value detection circuit 17 receives the maximum recitifed signal from the maximum phase signal detection circuit 15B and converts it into an effective value (root-mean-square value) to be detected.

A grounding trip circuit 18 issues a trip signal when the grounding signal reproduced in the grounding signal reproducing circuit 13 exceeds a value specified by a predetermined grounding trip characteristic stored in the grounding trip circuit 18. A long time delay trip circuit 19 issues a trip signal when the effective value, namely a detection voltage of the effective value detection circuit 17, exceeds a value specified by a predetermined long time delay trip characteristic. A short time delay trip circuit 20 issues a trip signal when the peak value detected in the peak value detection circuit 16 exceeds a value specified by a predetermined short time delay trip characteristic. An instantaneous trip circuit 21 issues a trip signal when the maximum rectified signal issued from the maximum phase selection circuit 15A exceeds a value specified by a predetermined instantaneous trip characteristic. A grounding trip indication circuit 22 is operated by the trip signal issued from the grounding trip circuit 18, thereby lighting an LED 22a and closing a contact 22b. A long time delay trip indication circuit 23 is operated by the trip signal issued from the long time delay trip circuit 19, thereby lighting an LED 23a and closing a contact 23b. An instantaneous or short time delay trip indication circuit 24 is operated by the trip signal issued from the short time delay trip circuit 20 or the instantaneous trip circuit 21, thereby lighting an LED 24a and closing a contact 24b.

A prealarm circuit 27, which is connected to the long time delay trip circuit 19 and the effective value detection circuit 17, issues a prealarm signal when the detection voltage of the effective value detection circuit 17 exceeds a value specified by a predetermined prealarm characteristic. A prealarm output circuit 28 is operated by the prealarm signal issued from the prealarm circuit 27, thereby lighting an LED 28a and closing a contact 28b. Power source for three indication circuits 22-24 and the prealarm output circuit 28 is supplied by an auxiliary power source circuit 29.

Figure 3:
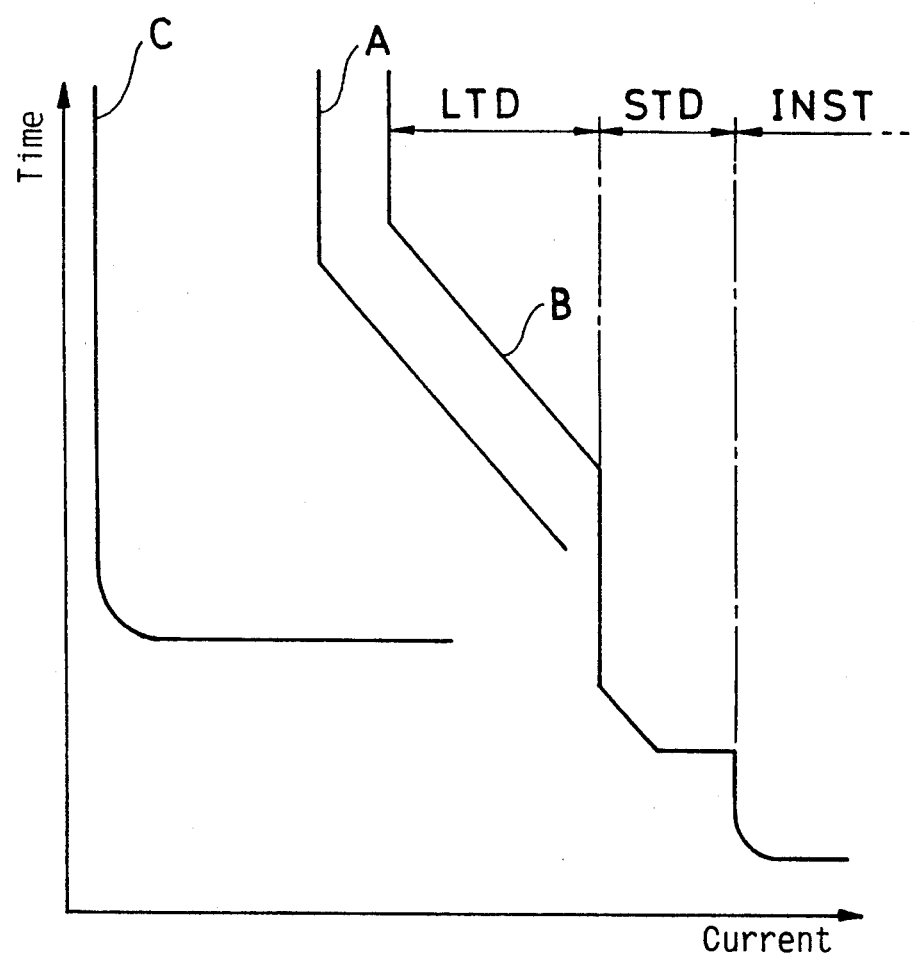
FIG. 3 is a graph showing time-current characteristic curves of the four-pole circuit breaker of the present invention.

The above-mentioned predetermined characteristics of long time delay, short time delay, instantaneous and prealarm are set by a characteristic setting circuit 26. Curves of these characteristics are shown in FIG. 3. A characteristic curve C represents the grounding trip characteristic, and a characteristic curve A represents the prealarm characteristic. A characteristic curve B consists of three characteristics in response to degree of overcurrent. That is, the long time delay trip characteristic is located in a current range of "LTD", and the short time delay trip characteristic is located in a current range of "STD". Further, the instantaneous trip characteristic is located in a current range of "INST".

In FIG. 1, an undervoltage detection circuit 25 is connected in parallel with the power source circuit 7 in order to always monitor an output voltage of the power source circuit 7. Output contacts 25a, 25b, 25c and 25d of the undervoltage detection circuit 25 are connected in series to output ends of the instantaneous trip circuit 21 (or the short time delay trip circuit 20), the long time delay trip circuit 19, the grounding trip circuit 18 and the prealarm circuit 27, respectively.

In the above-mentioned prealarm circuit breaker 5, when the output voltage of the power source circuit 7 is normal, all the output contacts 25a, 25b, 25c and 25d are closed. In this state, when the trip signal is issued from the trip circuit 18, 19, 20 or 21, the solid state switch 8 is closed. The trip coil 3 is thereby excited, and the main contact 2 is opened. Thus, the prealarm circuit breaker 5 falls in a trip state.

When the prealarm signal is issued from the prealarm circuit 27 before the trip signal is issued, the prealarm output circuit 28 lights the LED 28a and closes the contact 28b in order to inform an operator of occurrence of prealarm state.

Figure 4:
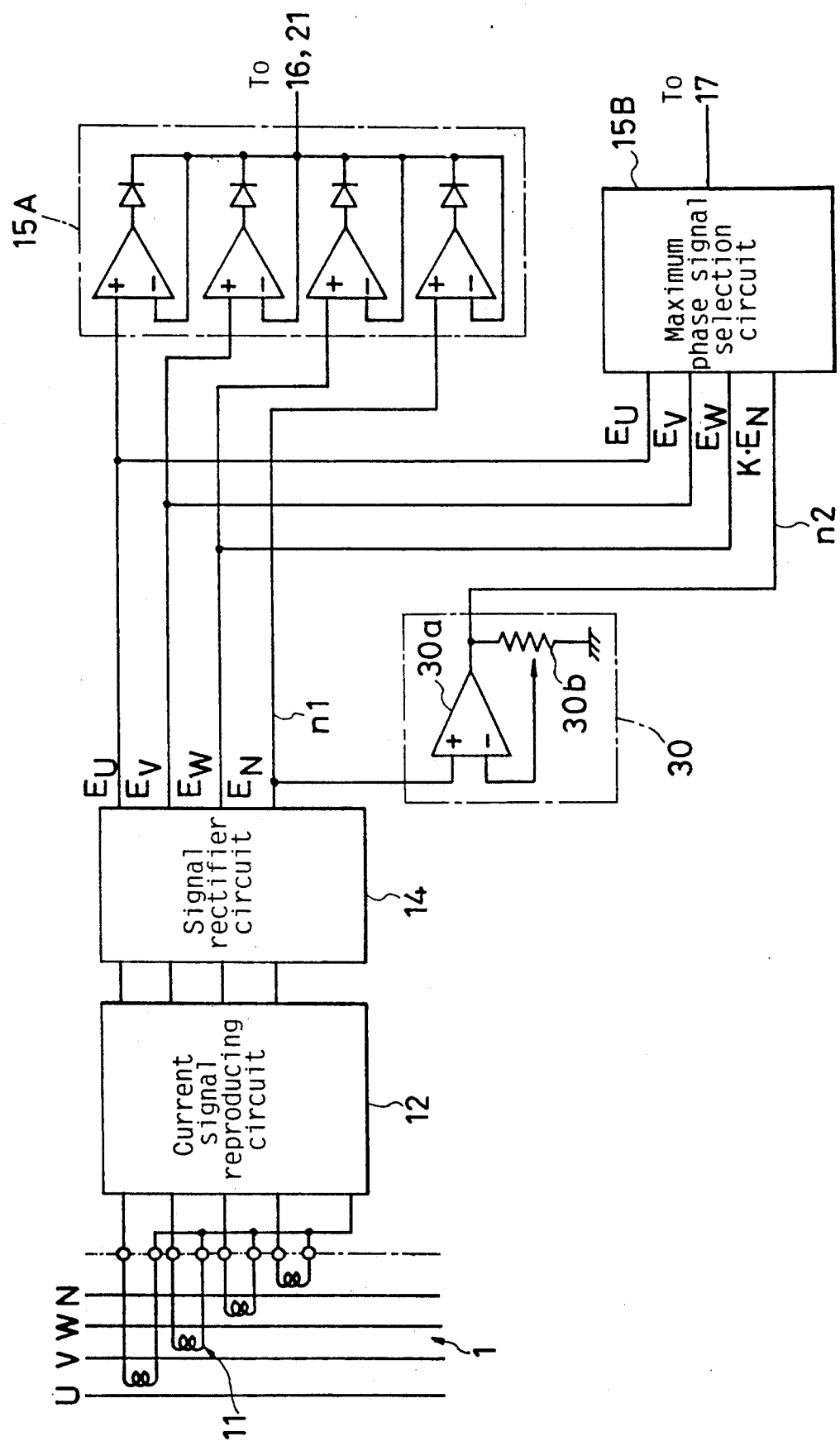
FIG. 4 is a block diagram showing a main part of the four-pole circuit breaker of the present invention.

Next, a main part of the embodiment is described. FIG. 4 is a block diagram showing internal circuits of the rated current reducing circuit 30 and the maximum phase selection circuits 15A and 15B, together with the neighboring circuits. The rated current reducing circuit 30 consists of an amplifier 30a and a variable resistor 30b. A non-inverted input terminal of the amplifier 30a is connected to an N phase output line n1 of the signal rectifier circuit 14, and an output terminal of the amplifier 30a is connected to an N phase input line n2 of the maximum phase signal selection circuit 15B. The output terminal of the amplifier 30a is also grounded via the variable resistor 30b. A slidable tap of the variable resister 30b is connected to an inverted input terminal of the amplifier 30a.

The maximum phase signal selection circuit 15A consists of four operational amplifiers 151-154 and four diodes 155-158.

When it is required for the N phase of the main circuit conductor 1 to have a rated current of one-half (50%) of the rated current of U, V and W phases, the variable resistor 30b is adjusted so as to give the amplifier 30a an amplification factor of "two" (2). Generally, when it is required for the N phase of the main circuit conductor 1 to have a rated current of 1/K of the rated current of other phases, the amplification factor of "K" is given to the rated current reducing circuit 30, wherein K is generally in a range of $1 \leq K \leq 2$. Therefore, a signal $E_N$ of the N phase issued from the signal rectifier circuit 14 is amplified by the rated current reducing circuit 30, and a signal of $K \cdot E_N$ is inputted to the maximum phase selection circuit 15B. As to other phases U, V and W, signals $E_U$, $E_V$ and $E_W$ issued from the signal rectifier circuit 14 are directly inputted to the maximum phase signal selection circuit 15B. Thus, detection level of the N-phase signal inputted to the maximum phase signal selection circuit 15B is K-times as large as the other phase signals. As a result, the rated current of the N phase is 1/K of that of the other phases. Since the rated current reducing circuit 30 is provided as a stage just before the maximum phase signal selection circuit 15B, operations of the instantaneous trip circuit 21 and the short time delay trip circuit 20 are not affected at all by the rated current reducing circuit 30.

In the above-mentioned four-pole circuit breaker 5 shown in FIG. 1 and FIG. 2, when the output voltage of the power source circuit 7 is normal, all the output contacts 25a, 25b, 25c and 25d are closed. In this state, when the trip signal is issued from the trip circuit 18, 19, 20 or 21, the solid state switch 8 is closed. The trip coil 3 is thereby excited and the main contact 2 is opened. Thus, the four-pole circuit breaker 5 falls in a trip state.

When the prealarm signal is issued from the prealarm circuit 27 before the trip signal is issued, the prealarm output circuit 28 lights the LED 28a and closes the contact 28b in order to inform an operator of occurrence of prealarm state.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A four-pole circuit breaker having U, V, W and N poles for corresponding phases, comprising:
    a current sensor for detecting currents flowing through said respective poles;
    current signal reproducing means for producing respective phase signals for said currents;
    a rated current reducing circuit which receives and amplifies only N phase signal of said respective phase signals;
    a maximum phase signal selection circuit which receives U, V and W phase signals of said respective phase signals and N phase signal which is amplified by said rated current reducing circuit, said maximum phase signal selection circuit selecting the maximum phase signal of said U, V and W phase signals and said amplified N phase signal; and
    a trip circuit for generating a trip signal in response to said maximum phase signal.

2. A four-pole circuit breaker in accordance with claim 1, wherein said rated current reducing circuit includes an amplifier whose amplification factor is variable.

3. A four-pole circuit breaker having U, V, W, and N poles for corresponding phases, comprising:
    a current sensor for detecting currents flowing through said U, V, W, and N poles, respectively;
    current signal reproducing means, responsive to said current sensor, for producing a U phase signal, a V phase signal, a W phase signal, and an N phase signal indicative of the magnitude of current flowing through said U, V, W, and N poles, respectively;
    a rated current reducing circuit, connected to receive only said N phase signal from said current signal producing means, for amplifying said N phase signal to produce an amplified N phase signal;
    a maximum phase signal selection circuit, connected to receive said U, V, and W phase signal from said current signal reproducing means and to receive said amplified N phase signal from said rated current reducing circuit, for selecting a maximum phase signal of said U, V, and W phase signals and said amplified N phase signal; and
    a trip circuit for generating a trip signal in response to said maximum phase signal.

* * * * *